Nov. 15, 1949     R. E. HERMAN     2,488,061
LOCK FOR HAY RAKES

Filed April 26, 1948     2 Sheets-Sheet 1

R. E. Herman
INVENTOR

BY *C. A. Snow & Co.*
ATTORNEYS.

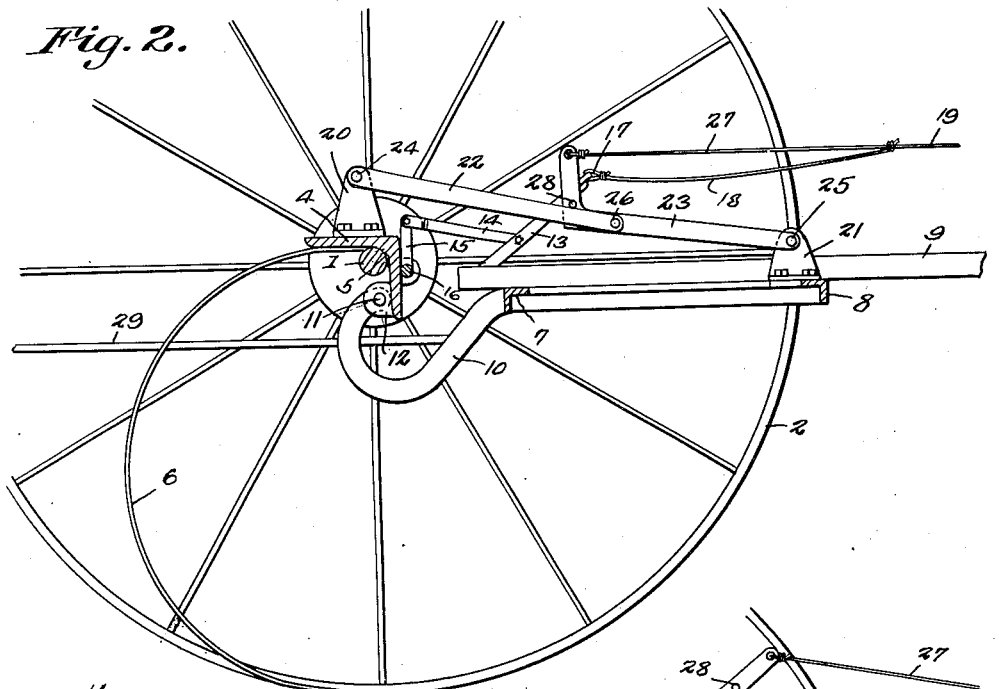
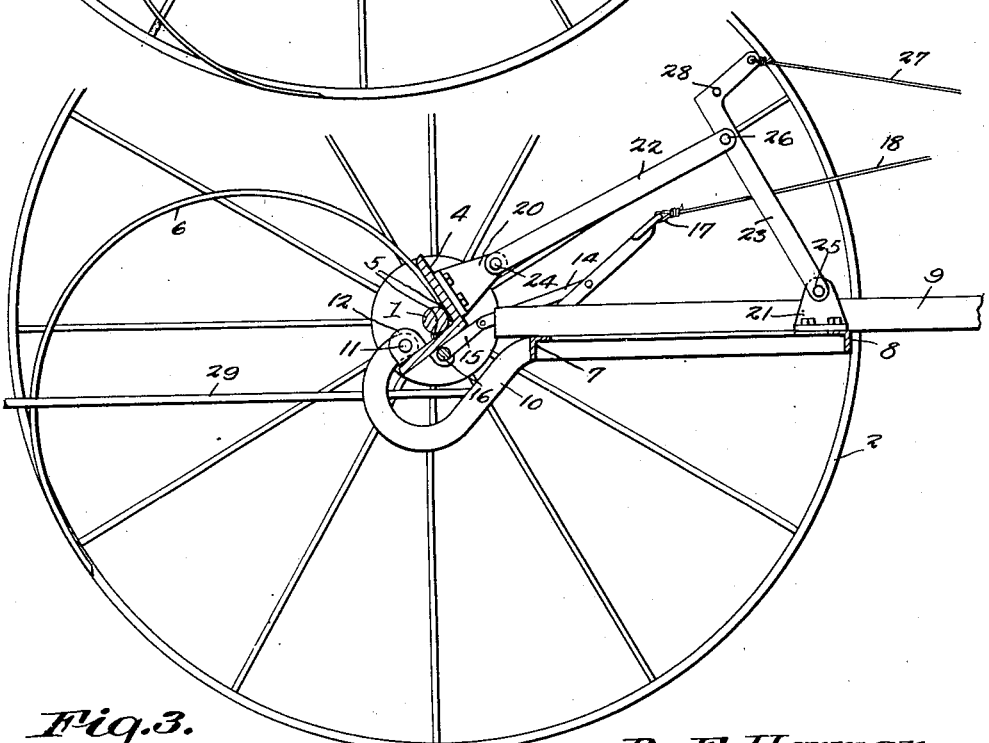

Patented Nov. 15, 1949

2,488,061

UNITED STATES PATENT OFFICE 2,488,061

LOCK FOR HAY RAKES

Ralph E. Herman, Norbeck, S. Dak.

Application April 26, 1948, Serial No. 23,212

1 Claim. (Cl. 56—386)

This invention relates to improvements in locks for hay rakes.

An object of the invention is to provide an improved lock mechanism for a hay rake.

Another object of the invention is to provide an improved lock mechanism used in connection with the usual rake trip mechanism on a hay rake, whereby the driver of the tractor used for pulling the hay rake may pull on a trip rope secured at its forward end to a point on the tractor adjacent the tractor seat, with its rear end branched and connected respectively to the lock release for the lock mechanism and to the rake trip mechanism, whereby the lock may be released and the hay rake tripped.

A further object of the invention is to provide an improved lock for a hay rake which will be used in combination with the usual hay rake trip mechanism for positively holding the rake down in operative position while in use, and said lock and rake trip being actuated by a trip rope connected therewith and extending to a point near the driver's seat on a tractor used for pulling the rake, whereby when the trip rope is pulled, the lock will be released immediately before the rake trip is actuated to dump the rake.

A still further object of the invention is to provide an improved lock mechanism for hay rakes which will be highly efficient in operation and relatively inexpensive to manufacture and produce.

Other objects will appear as the description proceeds.

In the accompanying drawings which form a part of this application:

Fig. 2 is a detail view of a hay rake with one wheel removed showing the improved lock mechanism in locked position.

Fig. 3 is a detail view of a hay rake with one wheel removed showing the improved lock mechanism in released position and the rake in dumping position.

Like characters of reference are used throughout the following specification and the accompanying drawings to designate corresponding parts.

Figure 1:
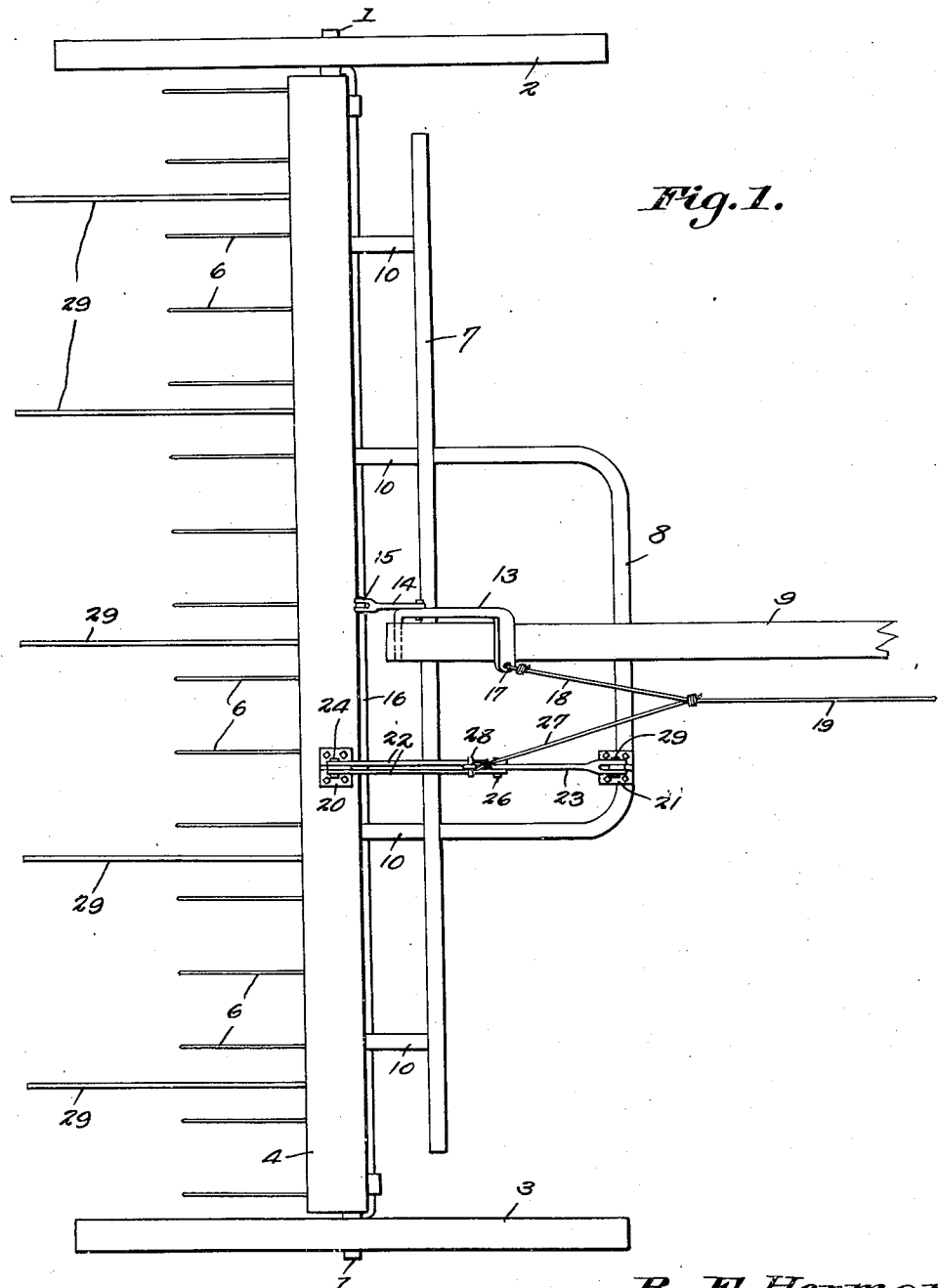
Figure 1 is a plan view of a hay rake showing the improved lock mechanism incorporated thereon.

In carrying out the invention, there is shown and provided a hay rake including a transversely extending supporting axle 1 having wheels 2 and 3 rotatably mounted upon the opposite ends thereof.

An angle iron tilting frame 4 is positioned upon the axle 1 and welded thereto at 5, and supports the plurality of arcuate rake teeth 6.

A main rake frame is provided and includes the transversely extending angle iron frame member 7 and the U-shape forwardly extending angle iron frame member 8 suitably secured thereto. A forwardly extending tongue 9 is attached to the frame members 7 and 8, and is adapted to be attached to a tractor (not shown) for pulling the hay rake over a field.

A plurality of rearwardly extending rake frame arms 10 are secured to the cross or transversely extending frame members 7 at their forward ends with their rear ends being hook-shaped and pivotally attached by the pins 11 with ears 12 secured to the angle iron tilting frame 4.

The usual rake dump treadle 13 is pivotally attached to the tongue 9, and is pivotally connected by the links 14 with the arm 15 attached to the transversely extending dump shaft 16 secured to the forward edge of the depending portion of the tilting frame 4. A ring 17 will be attached to the upper end of the dump treadle 13 for attaching the short lead 18 of the rake actuating line 19 hereinafter more fully described.

The subject matter of the invention comprises the upwardly extending brackets 20 and 21 secured respectively to the top surface of the tilting frame 4 and to the frame members 8, and the parallel levers 22 and the forked bell crank locking lever 23 respectively pivoted at 24 and 25 to said brackets 20 and 21. The forward ends of the levers 22 are pivoted at 26 to the longer arm of the bell cranking locking lever 23, and the shorter arm of the lever 23 extends upwardly, supporting the longer lead 27 of the rake actuating line 19 whose forward end extends to a point adjacent the driver's seat of the tractor (not shown), in easy reach of the driver who will pull the actuating line 19 to first release the locking lever 23 by pulling it upwardly and then actuating the rake dump treadle 13.

A transversely extending stop pin 28 is supported by the bell crank locking lever 23 for engagement with the pivoted levers 22 when the lever 23 has dropped past the dead center point with the levers 22 and 23 disposed in approximate alignment when in locked position.

A plurality of rearwardly extending transversely spaced rake teeth cleaning rods 29 will be supported by the rake frame arms 10 for automatically cleaning the rake teeth when the rake is dumped in the manner hereinbefore described.

Obviously when the actuating line 19 is released, the rake teeth 6 and their supporting tilting frame will drop by gravity to raking position.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

In a device of the character described, a wheel supported hay rake embodying a main frame including a tongue, a substantially U-shaped auxiliary frame slidably mounted on the main frame under the tongue, the rear ends of the U-shaped frame being curved downwardly and upwardly, a tilting frame pivotally mounted on the main frame, rake teeth extending from the tilting frame, said curved ends of the movable frame being connected with the tilting frame, a locking mechanism normally locking the tilting frame against pivotal movement, including a lever pivotally connected with the tilting frame, a bell crank lever pivotally connected with the auxiliary frame, said levers being pivotally connected, the connected ends of the levers being normally disposed below the line of dead center normally holding the levers in their extended positions, one end of the bell crank lever extending upwardly beyond the pivot point between the levers, a rake actuating line connected to the upwardly extended end of the bell crank lever, a rake dump means including pivotally connected links, connected to the tilting frame, and a treadle connected to the main frame, a lead line connected between the treadle and rake actuating line, the lead line being normally slack whereby the rake actuating line operates releasing the tilting frame prior to the operation of the rake dump means, when the actuating line is pulled.

RALPH E. HERMAN.

REFERENCES CITED

The following references are of record in the file of this patent:

UNITED STATES PATENTS

| Number | Name | Date |
| --- | --- | --- |
| Re. 8,983 | Brinser | Dec. 2, 1879 |
| 2,300,164 | Musselman | Oct. 27, 1942 |